United States Patent
Xu et al.

(10) Patent No.: US 11,955,762 B2
(45) Date of Patent: Apr. 9, 2024

(54) LASER PULSE ENERGY AMPLIFICATION DEVICE AND METHOD, AND FEMTOSECOND LASER

(71) Applicant: FEMTOSECOND RESEARCH CENTER CO., LTD., Guangzhou (CN)

(72) Inventors: Bingwei Xu, Guangzhou (CN); Xin Zhu, Guangzhou (CN)

(73) Assignee: FEMTOSECOND RESEARCH CENTER CO., LTD., Guangzhou (CN)

(*) Notice: Subject to any disclaimer, the term of this patent is extended or adjusted under 35 U.S.C. 154(b) by 0 days.

(21) Appl. No.: 18/026,133

(22) PCT Filed: Sep. 8, 2021

(86) PCT No.: PCT/CN2021/117236
§ 371 (c)(1),
(2) Date: Mar. 14, 2023

(87) PCT Pub. No.: WO2022/057709
PCT Pub. Date: Mar. 24, 2022

(65) Prior Publication Data
US 2023/0318243 A1    Oct. 5, 2023

(30) Foreign Application Priority Data
Sep. 16, 2020 (CN) .......................... 202010977397.5

(51) Int. Cl.
*H01S 3/00* (2006.01)
*G02F 1/365* (2006.01)
(Continued)

(52) U.S. Cl.
CPC ............ *H01S 3/0057* (2013.01); *G02F 1/365* (2013.01); *H01S 3/06754* (2013.01); *H01S 3/094003* (2013.01); *H01S 3/094076* (2013.01)

(58) Field of Classification Search
CPC .............. H01S 3/0057; H01S 3/06754; H01S 3/094003; H01S 3/094076; G02F 1/365
See application file for complete search history.

(56) References Cited

U.S. PATENT DOCUMENTS 5,689,361 A * 11/1997 Damen ................. H01S 3/0057
359/305
2003/0099264 A1    5/2003 Dantus et al.
(Continued)

FOREIGN PATENT DOCUMENTS

CN      105470800 A      4/2016
CN      106125448 A      11/2016
(Continued)

OTHER PUBLICATIONS

Pavel Sidorenko, et al., Nonlinear ultrafast fiber amplifiers beyond the gain-narrowing limit, 2019.
(Continued)

*Primary Examiner* — Eric L Bolda
(74) *Attorney, Agent, or Firm* — Bayramoglu Law Offices LLC (57) ABSTRACT

A laser pulse energy amplification device and method, and a femtosecond laser are provided. The laser pulse energy amplification device includes a pulse amplifier and a pulse shaper that are connected in sequence. The pulse amplifier is connected to an output port of a seed laser source and is connected to the pulse shaper that outputs a femtosecond laser pulse. The seed laser source is configured to generate and input a seed laser pulse to the pulse amplifier. The pulse amplifier is configured to introduce a nonlinear phase shift into the seed laser pulse, perform energy amplification and spectral stretching, and output an energy-amplified laser pulse with a nonlinear phase to the pulse shaper. The pulse shaper is configured to measure a shape and/or the nonlinear (Continued)

phase of the energy-amplified laser pulse, and shape the energy-amplified laser pulse according to the shape and/or the nonlinear phase.

10 Claims, 4 Drawing Sheets

(51) Int. Cl.
*H01S 3/067* (2006.01)
*H01S 3/094* (2006.01)

(56) References Cited

U.S. PATENT DOCUMENTS

| | | | | |
|---|---|---|---|---|
| 2007/0047595 | A1* | 3/2007 | Liu | H01S 3/0057 372/18 |
| 2007/0047965 | A1* | 3/2007 | Liu | H04B 10/299 398/147 |
| 2010/0187208 | A1* | 7/2010 | Dantus | B23K 26/0624 219/121.72 |
| 2011/0007760 | A1* | 1/2011 | Clowes | H01S 3/2308 372/6 |
| 2012/0049092 | A1* | 3/2012 | Tu | G02F 1/353 250/504 R |
| 2012/0076504 | A1* | 3/2012 | Dantus | H01S 3/005 359/347 |
| 2014/0218789 | A1 | 8/2014 | Clowes et al. | |
| 2016/0028204 | A1* | 1/2016 | Tu | H01S 3/0057 385/27 |
| 2020/0076149 | A1* | 3/2020 | Papp | H01S 3/0078 |
| 2020/0259305 | A1 | 8/2020 | Piccoli et al. | |
| 2022/0294177 | A1* | 9/2022 | Yusim | H01S 3/1603 |

FOREIGN PATENT DOCUMENTS

| | | |
|---|---|---|
| CN | 205693131 U | 11/2016 |
| CN | 106207718 A | 12/2016 |
| CN | 107462336 A | 12/2017 |
| CN | 108539573 A | 9/2018 |
| CN | 109818241 A | 5/2019 |
| CN | 111064069 A | 4/2020 |
| CN | 112152066 A | 12/2020 |
| JP | H08213682 A | 8/1996 |
| JP | 2008129205 A | 6/2008 |
| JP | 2009206484 A | 9/2009 |
| JP | 2012215905 A | 11/2012 |
| JP | 2013025284 A | 2/2013 |
| JP | 2015505162 A | 2/2015 |
| JP | 2016540380 A | 12/2016 |
| WO | WO-2018183683 A1 * | 10/2018 ........... H01S 3/0057 |

OTHER PUBLICATIONS

Julien Pouysegur, et al., Generation of 150-fs pulses from a diode-pumped Yb:KYW nonlinear regenerative amplifier, Optics Express, 2014, vol. 22, No. 8.

Satoshi Ashihara, et al, Femtosecond Cascaded Second-Order Nonlinearities in Quasi-Phase-Matching Devices, Topical Paper, 2004, pp. 170-174.

Kuroda Kazuo, Nonlinear optical frequency conversion of ultra-short light pulses, Institute of Production Technology, University of Tokyo, pp. 1-10.

* cited by examiner

FIG. 6

LASER PULSE ENERGY AMPLIFICATION DEVICE AND METHOD, AND FEMTOSECOND LASER

CROSS REFERENCE TO THE RELATED APPLICATIONS

This application is the national phase entry of International Application No. PCT/CN2021/117236, filed on Sep. 8, 2021, which is based upon and claims priority to Chinese Patent Application No. 202010977397.5, filed on Sep. 16, 2020, the entire contents of which are incorporated herein by reference.

TECHNICAL FIELD

The present application relates to the technical field of laser and in particular to a laser pulse energy amplification device and method, and a femtosecond laser.

BACKGROUND

Figure 1:
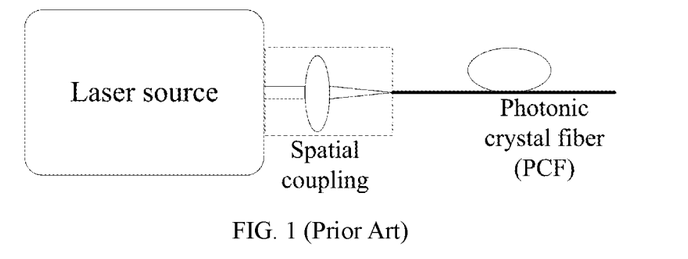
FIG. 1 is a schematic diagram showing a common generation process of a laser pulse with a super-continuum spectrum.

In nonlinear microscopy, a laser pulse with a special spectrum is often used to excite a desired nonlinear physical process to generate a spectral signal. A common generation method of the special laser pulse is shown in FIG. 1. A high-power femtosecond seed laser source and a highly nonlinear photonic crystal fiber (PCF) are used, and the laser pulse generated by the laser source is focused into the core of the PCF to generate a super-continuum spectrum.

Figure 2:
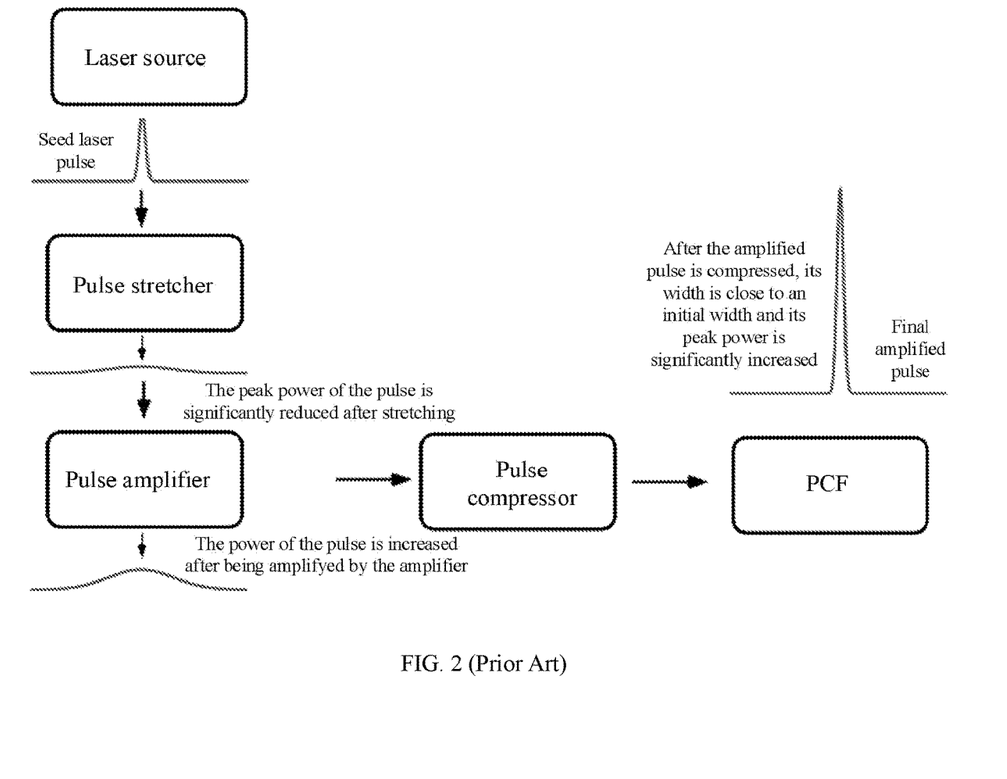
FIG. 2 is a schematic diagram of a common high-power femtosecond laser pulse amplifier.

The high-power femtosecond seed laser source is usually realized by a fiber amplifier. In the Chinese patent application 201710916860.3, the fiber amplifier usually uses chirped pulse amplification (CPA) due to the fact that during the amplification process, the gain fiber is protected from being burned by the energy-amplified pulse, and the energy amplification process avoids introducing a large number of nonlinear phase shifts that cannot be compensated by a pulse compressor. Referring to FIG. 2, generally, the fundamental principles are that positive chirp is introduced through a pulse stretcher (usually grating pair(s) or a passive optical fiber of tens to hundreds of meters in length) before the laser pulse enters the fiber amplifier and is stretched several orders of magnitude along the time axis. After the laser pulse is amplified, chirp compensation is performed by a pulse compressor (usually grating pair(s) or a specially designed negatively chirped fiber), and the laser pulse is compressed to an ideal femtosecond range to acquire the desired high-power femtosecond seed laser source.

However, in the above technical solution, the construction process of the grating pairs in the pulse stretcher and the pulse compressor is complex and requires high accuracy. In particular, the specially designed negatively chirped fiber is expensive, therefore the said high-power femtosecond seed laser source has exhibited high cost and low efficiency.

SUMMARY

To solve most, if not all, of the above technical defects, in particular, the high-power femtosecond seed laser source has high cost and low efficiency, an objective of the present application is to provide a laser pulse energy amplification device and method, and a femtosecond laser.

The laser pulse energy amplification device includes a pulse amplifier and a pulse shaper that are connected in sequence.

The pulse amplifier is connected to an output port of a seed laser source, and an output end of the pulse shaper outputs a femtosecond laser pulse.

The seed laser source is configured to generate and input a seed laser pulse to the pulse amplifier.

The pulse amplifier is configured to introduce a nonlinear phase shift into the seed laser pulse such that a spectrum of the seed laser pulse is stretched in a frequency domain, when the seed laser pulse is stretched in a time domain, and output an energy-amplified laser pulse with a nonlinear phase to the pulse shaper.

The pulse shaper is configured to measure the shape and/or the nonlinear phase of the energy-amplified laser pulse, then shape the said energy-amplified laser pulse according to the shape and/or the nonlinear phase, and output the femtosecond laser pulse.

In an embodiment, the pulse amplifier includes a pump light source and a nonlinear medium that are connected in sequence.

The pump light source is configured to perform energy amplification on the seed laser pulse, and the nonlinear medium is configured to introduce the nonlinear phase shift into the seed laser pulse.

In an embodiment, the pulse amplifier includes a high-power pump light source and a weakly nonlinear medium that are connected in sequence.

In an embodiment, the nonlinear medium includes a strongly nonlinear active optical fiber and/or a strongly nonlinear passive optical fiber.

In an embodiment, the pulse amplifier includes the pump light source, a strongly nonlinear active optical fiber, and a strongly nonlinear passive optical fiber that are connected in sequence.

In an embodiment, the pulse shaper includes:
 a measurement module configured to measure the shape and/or the nonlinear phase of the (energy-amplified) laser pulse; and
 a compensation module configured to perform phase compensation on the energy-amplified laser pulse according to the shape and/or the nonlinear phase of the energy-amplified laser pulse, compress the energy-amplified laser pulse into a Gaussian or Gaussian-like shape; and output a femtosecond laser pulse approaching Fourier transform limit.

The laser pulse energy amplification method includes the following steps:
 receiving a seed laser pulse output by a seed laser source;
 introducing a nonlinear phase shift into the seed laser pulse such that a spectrum of the seed laser pulse is stretched in a frequency domain, when the seed laser pulse is stretched in a time domain, and outputting an energy-amplified laser pulse with a nonlinear phase to the pulse shaper; and
 measuring a shape and/or the nonlinear phase of the energy-amplified laser pulse, shaping the energy-amplified laser pulse according to the shape and/or the nonlinear phase, and outputting the femtosecond laser pulse.

In an embodiment, the laser pulse energy amplification method further includes: performing energy amplification on the seed laser pulse by a pump light source, and introducing the nonlinear phase shift into the seed laser pulse by a nonlinear medium.

In an embodiment; the process of measuring the shape and/or the nonlinear phase of the energy-amplified laser pulse, shaping the energy-amplified laser pulse according to the shape and/or the nonlinear phase, and outputting the femtosecond laser pulse includes:

measuring the shape and/or the nonlinear phase of the energy-amplified laser pulse; and performing phase compensation on the energy-amplified laser pulse according to the shape and/or the nonlinear phase measured of the energy-amplified laser pulse; compressing the energy-amplified laser pulse into a Gaussian or Gaussian-like shape, and outputting a femtosecond laser pulse approaching Fourier transform limit.

The femtosecond laser includes a seed laser source and a laser pulse energy amplification device.

The laser pulse energy amplification device includes a pulse amplifier and a pulse shaper that are connected in sequence.

The pulse amplifier is connected to an output port of a seed laser source, and an output end of the pulse shaper outputs a femtosecond laser pulse.

The seed laser source is configured to generate and input a seed laser pulse to the pulse amplifier.

The pulse amplifier is configured to introduce a nonlinear phase shift into the seed laser pulse such that a spectrum of the seed laser pulse is stretched in a frequency domain when the seed laser pulse is stretched in a time domain, and output an energy-amplified laser pulse with a nonlinear phase to the pulse shaper.

The pulse shaper is configured to measure the shape and/or the nonlinear phase of the energy-amplified laser pulse, shape the energy-amplified laser pulse according to the shape and/or the nonlinear phase measured, and output the femtosecond laser pulse.

In the above-described laser pulse energy amplification device and method and femtosecond laser, the seed laser pulse generated from the seed laser source is not linearly stretched by means of chirped amplification. Instead, the nonlinear phase shift is introduced into the energy amplification process in the pulse amplifier, which makes the seed laser pulse nonlinearly extremely stretched in the time domain and achieves a similar effect as the chirped amplification. In addition, due to the nonlinear phase shift, the seed laser pulse is stretched in the frequency domain during the energy amplification process, which is similar to the spectral stretching effect of a photonic crystal fiber (PCF). The technical solution avoids the use of a fiber amplifier using the chirped pulse amplification (CPA) technique, while utilizes nonlinear time-domain stretching effects to protect the safety of the gain fiber and simultaneously generates the energy-amplified laser pulse, saving equipment costs and reducing the production cost of the high-power femtosecond laser pulse.

In addition, in the energy amplification process of the laser pulse, the nonlinear phase shift can be achieved by increasing the pump energy. By further introduction of larger nonlinear phase shifts through the nonlinear medium, the seed laser pulse is stretched along the time axis, achieving an extreme time-domain stretching effect similar to that of the CPA and a spectral stretching effect similar to that of the PCT.

Furthermore, in the pulse shaping process, the shape and/or the nonlinear phase of the laser pulse are measured to determine and compensate for the chaotic pulse train in the laser pulse. Therefore, the laser pulse is compressed, with the same spectral shape maintained, into a Gaussian or Gaussian-like shape to obtain the femtosecond laser pulse which approaches Fourier transform limit.

Additional aspects and advantages of the present application will be provided in the following description or become evident in the following description or understood through the practice of the present application.

BRIEF DESCRIPTION OF THE DRAWINGS

The foregoing and/or additional aspects and advantages of the present application will become apparent and readily understood from the following descriptions of the embodiments with reference to the drawings.

DETAILED DESCRIPTION OF THE EMBODIMENTS

The embodiments of the present application are described below in detail. The embodiments are shown in the drawings. The same or similar numerals represent the same or similar elements or elements having the same or similar functions throughout the specification. The embodiments described below with reference to the drawings are exemplary and are merely intended to explain the present application rather than to limit the present application.

Those skilled in the art can understand that, unless otherwise stated, the singular forms "a", "an", "said" and "the" used herein may also include plural forms. It should be further understood that the word "comprising" used in the specification of the present application refers to the presence of the described features, integers, steps, operations, elements, and/or components but does not exclude the presence or addition of one or more other features, integers, steps, operations, elements, components, and/or a combination thereof.

In conventional technology, a seed laser source generates a seed laser pulse, which needs to be energy-amplified and compressed into a femtosecond pulse. The chirped pulse amplification (CPA) method can protect the gain fiber from being burned by the energy-amplified laser pulse and avoid the introduction of a large number of nonlinear phase shifts that cannot be compensated by a pulse compressor during energy amplification process. In this conventional solution, the cost of building the laser equipment is high, and the use efficiency is affected. Given this, the present application provides the following technical solutions.

Figure 3:
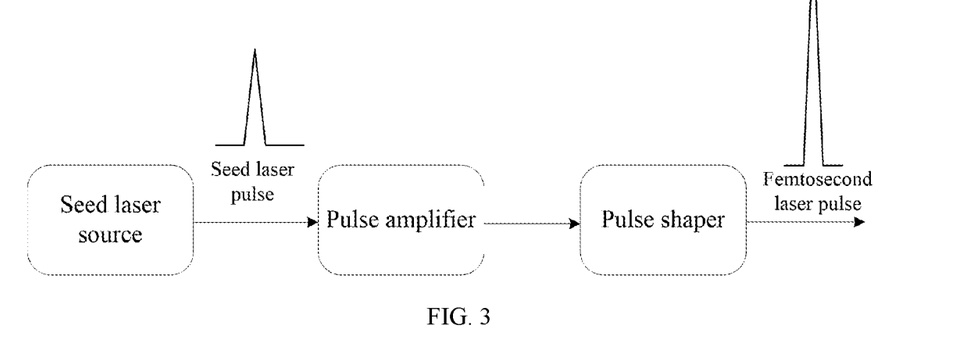
FIG. 3 is a structure diagram of a laser pulse energy amplification device according to an embodiment of the present application.

FIG. 3 is a structure diagram of a laser pulse energy amplification device according to an embodiment of the present application. Referring to FIG. 3, the laser pulse energy amplification device includes a pulse amplifier and a pulse shaper that are connected in sequence.

The pulse amplifier is connected to an output port of a seed laser source, and an output end of the pulse shaper outputs a femtosecond laser pulse.

The seed laser source is configured to generate and input the seed laser pulse to the pulse amplifier. The pulse amplifier is configured to introduce a nonlinear phase shift into the seed laser pulse such that a spectrum of the seed laser pulse is stretched in a frequency domain when the seed laser pulse is stretched in a time domain, and output an energy-amplified laser pulse with a nonlinear phase to the pulse shaper. The pulse shaper is configured to measure a shape and/or the nonlinear phase of the energy-amplified laser pulse, shape the energy-amplified laser pulse according to the shape and/or the nonlinear phase, and output the femtosecond laser pulse.

Figure 4:
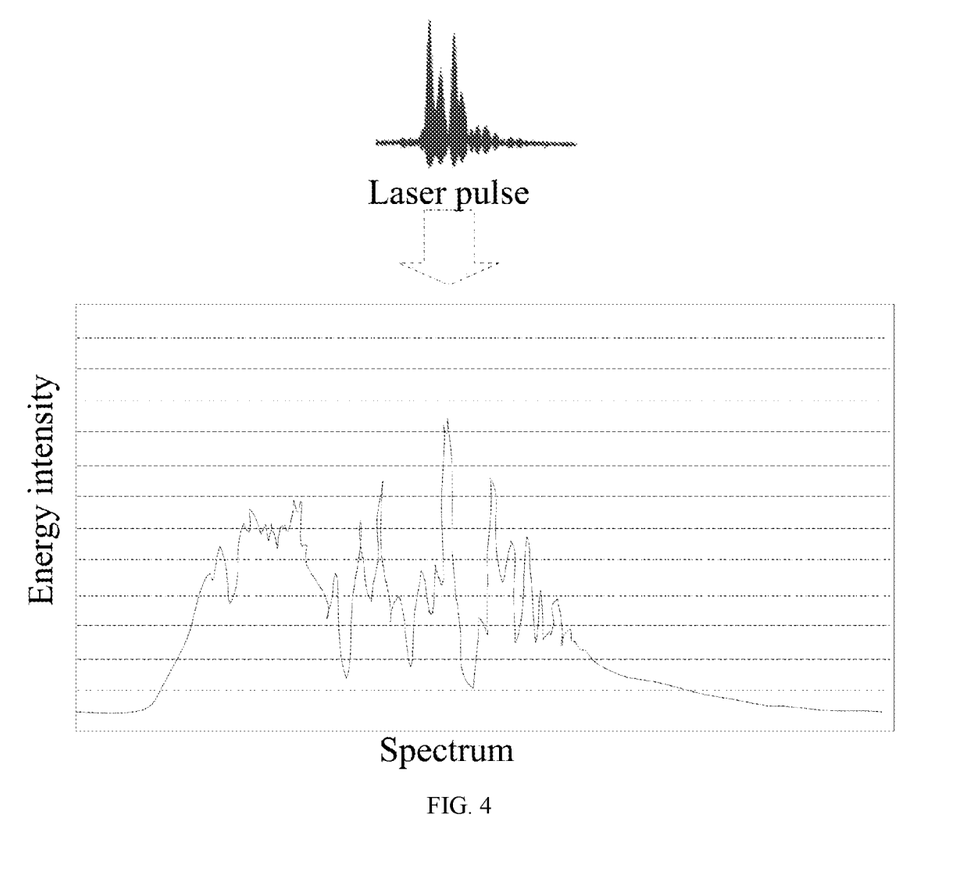
FIG. 4 shows a stretched spectrum of a laser pulse according to an embodiment of the present application.

In the technical solution of the present application, the seed laser pulse is directly amplified, and a large number of nonlinear phase shifts are actively introduced into the fiber amplifier to change the shape of the laser pulse, forming a stretching mode similar to multiple pulse trains as shown in FIG. 4. In this way, the pulse energy is distributed along a longer time axis, and the peak power is reduced to protect the fiber amplifier. In addition, this nonlinear phase shift can produce a stretched spectrum.

FIG. 4 shows a stretched spectrum of a laser pulse according to an embodiment of the present application. It can be seen from FIG. 4 that after the laser pulse passes through the pulse amplifier, a super-continuum spectrum spectral stretching effect similar to that observed in a photonic crystal fiber (PCF) appears, which directly generates the required super-continuum spectrum in the pulse amplifier. However, the laser pulse corresponding to the super-continuum spectrum has a large number of nonlinear phase shifts, so it shows a mode similar to multiple pulse trains in the time domain as shown in the upper part of FIG. 4, and it is necessary to perform nonlinear phase compensation to compress the laser pulse. In the compression stage, it is necessary to avoid filtering and interception of the spectral energy. The shape and/or the nonlinear phase of the laser pulse are measured by the pulse shaper to shape the laser pulse and directly output the femtosecond laser pulse.

In the laser pulse energy amplification device provided by the above embodiment, the seed laser pulse generated by the seed laser source is not linearly stretched by the pulse stretcher using chirped amplification. Instead, the nonlinear phase shift is introduced into the energy amplification process of the pulse amplifier, which makes the seed laser pulse extremely and nonlinearly stretched in the time domain and achieves a similar effect as the chirped amplification. In addition, due to the nonlinear phase shift, the seed laser pulse is stretched in the frequency domain during the energy amplification process, which is similar to the spectral stretching effect of a photonic crystal fiber (PCF). The technical solution avoids the use of a fiber amplifier using the CPA technique, saves equipment costs, reduces the production cost of the high-power femtosecond laser pulse, and improves the use efficiency. Moreover, in comparison to the CPA process that reduces the spectral width, the pulse energy amplification process of the present application achieves the purpose of spectral stretching.

More embodiments of the pulse amplifier in the technical solution of the present application are described below.

In an embodiment, the pulse amplifier may include a pump light source and a nonlinear medium that are connected in sequence. The pump light source is configured to perform pump energy amplification on the seed laser pulse, and the nonlinear medium is configured to introduce the nonlinear phase shift into the seed laser pulse. Specifically, an optical fiber combiner and the seed light source deliver the pump light source connected to the optical fiber to increase the pump energy of the laser pulse. It can be electrically or optically pumped. Regarding the nonlinear medium, it includes a strongly nonlinear active optical fiber and/or a strongly nonlinear passive optical fiber. A large number of nonlinear phase shifts are introduced into the optical fiber through the nonlinear medium, such that the laser pulse is nonlinearly stretched in the time domain, the peak power is reduced, and the gain medium is protected.

In another embodiment, the pulse amplifier may further include a high-power pump light source and a weakly nonlinear medium that are connected in sequence. If the power of the pump light source is low, a strongly nonlinear medium can be used to introduce the nonlinear phase shift. The strongly nonlinear active optical fiber and passive optical fiber can introduce a large number of nonlinear phase shifts in the amplification process, which can produce a continuous spectrum of multiple pulse trains. If the pump power is high, an auxiliary weakly nonlinear medium can be used to introduce the nonlinear phase shift.

In another embodiment, the pulse amplifier may further include the pump light source, a strongly nonlinear active optical fiber, and a strongly nonlinear passive optical fiber that are connected in sequence. In this embodiment, the pump light source, the strongly nonlinear medium, and the strongly nonlinear medium are combined to introduce more nonlinear phases into the optical fiber.

In summary of the embodiments above, the pump light source increases the pump energy of the laser pulse when nonlinear medium, such as active or passive optical fiber, can be used by applying its own nonlinear phase to achieve the spectral stretching of the laser pulse, as well as an extended pulse width along the time axis. Therefore, in the absence of the fiber amplifier using the CPA technique, the gain fiber is protected and energy-amplified laser pulse is generated. Such a technically convenient design can reduce the construction complexity as well as cost of the laser equipment, and improves its use efficiency.

More embodiments of the technical solutions for the pulse shaper of the present application are described below.

Figure 5:
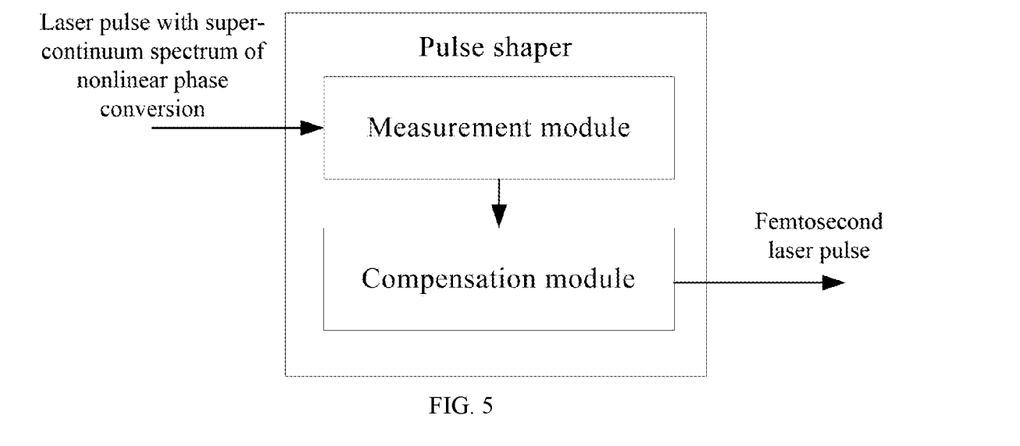
FIG. 5 is a structure diagram of a pulse shaper according to an embodiment of the present application.

FIG. 5 is a structure diagram of a pulse shaper according to an embodiment of the present application. Referring to FIG. 5, the pulse shaper may functionally include a measurement module and a compensation module. The measurement module is configured to measure the shape and/or the nonlinear phase of the energy-amplified laser pulse. The compensation module is configured to perform phase compensation on the energy-amplified laser pulse according to the shape and/or the nonlinear phase of the energy-amplified laser pulse, compress the energy-amplified laser pulse into a Gaussian or Gaussian-like shape, and output the femtosecond laser pulse.

Specifically, the shape and the nonlinear phase of the laser pulse are first measured. Then, based on the shape and the nonlinear phase of the laser pulse, the laser pulse is compensated by a correlation compensation algorithm, such that the laser pulse can be compressed into a Gaussian shape to output the femtosecond laser pulse.

In the solution of the above embodiment, during the pulse shaping process, the shape and/or the nonlinear phase of the laser pulse are measured to measure and compensate for the chaotic pulse trains in the laser pulse. Therefore, the laser pulse is compressed into a Gaussian shape while the same spectral shape is maintained, and the desired femtosecond laser pulse is acquired.

An embodiment of a laser pulse amplification method of the present application is described below.

Figure 6:
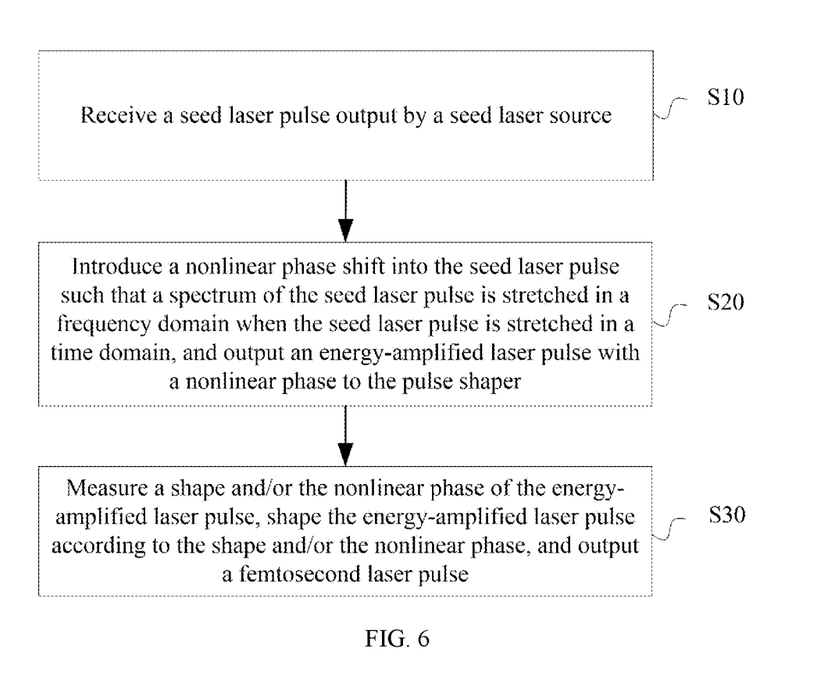
FIG. 6 is a flowchart of a laser pulse energy amplification method according to an embodiment of the present application.

FIG. 6 is a flowchart of a laser pulse energy amplification method according to an embodiment of the present application. Referring to FIG. 6, the laser pulse energy amplification method mainly includes the following steps:

S10. A seed laser pulse output by a seed laser source is received.

Specifically, the seed laser source may be received by a pulse amplifier provided at an output port of the seed laser pulse.

S20. A nonlinear phase shift is introduced into the seed laser pulse such that a spectrum of the seed laser pulse is stretched in a frequency domain when the seed laser pulse is stretched in a time domain, and an energy-amplified laser pulse with a nonlinear phase is output to the pulse shaper.

In this process, the seed laser pulse is directly amplified, and a large number of nonlinear phase shifts are actively introduced into the fiber amplifier to change the shape of the laser pulse, forming multiple pulse trains. In this way, the pulse energy is distributed along a longer time axis, and the peak power is reduced to protect the fiber amplifier. In addition, this nonlinear phase shift can produce a stretched spectrum.

FIG. 4 shows a stretched spectrum of a laser pulse. Referring to FIG. 4, after the laser pulse passes through the pulse amplifier, the seed laser pulse is extremely nonlinearly stretched in the time domain, achieving an effect similar to that of the chirped amplification method. Through the nonlinear phase shift, the seed laser pulse is stretched in the frequency domain, which is similar to the stretching effect of a photonic crystal fiber (PCF).

S30. The shape and/or the nonlinear phase of the laser pulse are measured, the laser pulse is shaped according to the shape and/or the nonlinear phase, and the femtosecond laser pulse is output.

Specifically, in the compression stage, it is not necessary to filter and intercept the spectral energy. The shape and/or the nonlinear phase of the laser pulse are measured by the pulse shaper to shape the laser pulse and directly output the femtosecond laser pulse.

In the solution of the above embodiment, the seed laser pulse generated by the seed laser source is not stretched first but directly amplified to achieve energy amplification and the introduction of the nonlinear phase shift. Then, the shape and/or the nonlinear phase of the laser pulse are measured, and the phase of the laser pulse is compensated according to the shape and/or the nonlinear phase of the laser pulse to acquire the femtosecond laser pulse. This technical solution avoids the use of the fiber amplifier using the CPA technique, saves equipment costs, reduces the production cost of the high-power femtosecond laser pulse, and improves production efficiency.

More embodiments of the technical solution for laser pulse amplification of the present application are described below.

In an embodiment, in step S20, the step of introducing the nonlinear phase shift may include:

S201. A pump light source amplifies the seed laser pulse. Specifically, the pump light source is provided at an output port of the seed laser source to increase the pump energy of the laser pulse by the methods of electrical or optical pumping.

S202. A nonlinear medium introduces a nonlinear phase into the seed laser pulse. Specifically, the nonlinear medium includes a strongly nonlinear active optical fiber and/or a strongly nonlinear passive optical fiber, which can introduce a large number of nonlinear phase shifts into the optical fiber to achieve the purpose of energy amplification.

In the above embodiments, the pump light source increases the pump energy of the laser pulse, the active or passive optical fiber or other nonlinear medium utilizes its nonlinear phase to achieve the spectral stretching of the laser pulse and utilizes the large number of nonlinear phase shifts generated during spectral stretching to increase the pulse width along the time axis. Such a design avoids the use of the fiber amplifier using the CPA technique, protects the gain fiber, and generates the energy-amplified laser pulse. Such a technically convenient design can reduce the construction complexity as well as cost of the laser equipment, and improve the use efficiency.

In an embodiment, the step S30 regarding the outputting of the femtosecond laser pulse may include:

S301. The shape and/or the nonlinear phase of the laser pulse are measured.

S302. A phase of the laser pulse is compensated according to the shape and/or the nonlinear phase of the laser pulse, the laser pulse is compressed into a Gaussian or Gaussian-like shape, and the femtosecond laser pulse is output.

In this process, the shape and the nonlinear phase of the laser pulse are first measured. Then, based on the shape and the nonlinear phase of the laser pulse, the laser pulse is compensated by a correlation compensation algorithm, such that the laser pulse can be compressed into a Gaussian or Gaussian-like shape to output the femtosecond laser pulse.

In the above embodiment, in the pulse shaping process, the shape and/or the nonlinear phase of the laser pulse are measured to measure and compensate for the chaotic pulse trains in the laser pulse. Therefore, the laser pulse is compressed into a Gaussian or Gaussian-like shape to obtain the femtosecond laser pulse, which approaches the Fourier transform limit, while the same spectral shape is maintained.

An embodiment of a femtosecond laser of the present application is described below.

Referring to FIG. 1, the femtosecond laser of the present application includes a seed laser source and a laser pulse energy amplification device indicated in any one of the above embodiments.

The femtosecond laser of the present application can avoid the use of the fiber amplifier using the CPA technique, save equipment costs, reduce the production cost of the high-power femtosecond laser pulse, and improve production efficiency. Moreover, in comparison to the CPA process that reduces the spectral width, the pulse energy amplification process of the present application achieves the purpose of spectral stretching.

Through present application, in the field of nonlinear microscopy, under circumstances that special spectral laser pulse is required, the laser equipment is not dependent on the application of fiber amplifier using the CPA technique. This saves the equipment cost, reduces the production cost of the high-power femtosecond laser pulse, and improves the use efficiency. Moreover, in comparison to CPA process that reduces the spectral width, the pulse energy amplification process of the present application achieves the purpose of spectral stretching.

Those skilled in the art can understand that, unless otherwise defined, all terms (including technical terms and scientific terms) used herein have the same meaning as those commonly understood by those of ordinary skills in the field of art to which the present application belongs. It should also be noted that terms such as those defined in general dictionaries should be understood as having meanings consistent with the meanings in the context of the prior art, and unless otherwise defined herein, these terms will not be explained in ideal or overly-formal meanings.

The foregoing are merely descriptions of the preferred embodiments of the present application. It should be noted that improvements and modifications can be made by those of ordinary skills in field of the art without deviating from the principles of the present application, and such improvements and modifications should also be considered as falling within the protection scope of the present application.

What is claimed is:

1. A laser pulse energy amplification device configured to perform an energy amplification on a seed laser source, comprising a pulse amplifier and a pulse shaper that are connected in sequence, wherein
the pulse amplifier is connected to an output port of the seed laser source, and an output end of the pulse shaper outputs a femtosecond laser pulse;
the seed laser source is configured to generate and input a seed laser pulse to the pulse amplifier;
the pulse amplifier is configured to introduce a nonlinear phase shift into the seed laser pulse by stretching a spectrum of the seed laser pulse in a frequency domain and stretching the seed laser pulse in a time domain with a peak power of the seed laser pulse reduced, and output an enemy-amplified laser pulse with a nonlinear phase to the pulse shaper; and
the pulse shaper comprises:
a measurement module configured to measure a shape and a nonlinear phase of the laser pulse; and
a compensation module configured to perform a phase compensation on the laser pulse according to the shape and the nonlinear phase of the laser pulse, compress the laser pulse into a Gaussian or Gaussian-like shape, and output the femtosecond laser pulse close to a Fourier transform limit.

2. The laser pulse energy amplification device according to claim 1, wherein the pulse amplifier comprises a pump light source and a nonlinear medium that are connected in sequence; and
the pump light source is configured to perform the energy amplification on the seed laser pulse, and the nonlinear medium is configured to introduce the nonlinear phase into the seed laser pulse.

3. The laser pulse energy amplification device according to claim 2, wherein the nonlinear medium comprises a nonlinear active optical fiber and/or a nonlinear passive optical fiber.

4. The laser pulse energy amplification device according to claim 3, wherein the pulse amplifier comprises the pump light source, a nonlinear active optical fiber, and a nonlinear passive optical fiber that are connected in sequence.

5. A laser pulse energy amplification method configured to perform an energy amplification on a seed laser source, comprising the following steps:
receiving a seed laser pulse output by the seed laser source;
introducing a nonlinear phase shift into the seed laser pulse by stretching a spectrum of the seed laser pulse in a frequency domain when hand stretching the seed laser pulse in a time domain with a peak power of the seed laser reduced, and outputting an energy-amplified laser pulse with a nonlinear phase to a pulse shaper; and
measuring a shape and a nonlinear phase of the laser pulse; and
performing a phase compensation on the laser pulse according to the shape and the nonlinear phase of the laser pulse, compressing the laser pulse into a Gaussian or Gaussian-like shape, and outputting the femtosecond laser pulse close to a Fourier transform limit.

6. The laser pulse energy amplification method according to claim 5, further comprising: performing, by a pump light source, the energy amplification on the seed laser pulse, and introducing, by a nonlinear medium, the nonlinear phase into the seed laser pulse.

7. A femtosecond laser, comprising the seed laser source and the laser pulse energy amplification device according to claim 1.

8. The femtosecond laser according to claim 7, wherein in the laser pulse energy amplification device, the pulse amplifier comprises a pump light source and a nonlinear medium that are connected in sequence; and
the pump light source is configured to perform the energy amplification on the seed laser pulse, and the nonlinear medium is configured to introduce the nonlinear phase into the seed laser pulse.

9. The femtosecond laser according to claim 8, wherein in the laser pulse energy amplification device, the nonlinear medium comprises a nonlinear active optical fiber and/or a nonlinear passive optical fiber.

10. The femtosecond laser according to claim 9, wherein in the laser pulse energy amplification device, the pulse amplifier comprises the pump light source, a nonlinear active optical fiber, and a nonlinear passive optical fiber that are connected in sequence.

* * * * *

UNITED STATES PATENT AND TRADEMARK OFFICE
CERTIFICATE OF CORRECTION

Page 1 of 1

PATENT NO. : 11,955,762 B2
APPLICATION NO. : 18/026133
DATED : April 9, 2024
INVENTOR(S) : Bingwei Xu and Xin Zhu It is certified that error appears in the above-identified patent and that said Letters Patent is hereby corrected as shown below:

In the Claims

In Claim 1, the term "enemy-amplified" in Line 15 should be revised to "energy-amplified".

Signed and Sealed this
Twenty-seventh Day of January, 2026

John A. Squires
*Director of the United States Patent and Trademark Office*